United States Patent
Satish et al.

(10) Patent No.: US 8,171,256 B1
(45) Date of Patent: May 1, 2012

(54) SYSTEMS AND METHODS FOR PREVENTING SUBVERSION OF ADDRESS SPACE LAYOUT RANDOMIZATION (ASLR)

(75) Inventors: Sourabh Satish, Redondo Beach, CA (US); William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 714 days.

(21) Appl. No.: 12/340,968

(22) Filed: Dec. 22, 2008

(51) Int. Cl.
  *G06F 12/00* (2006.01)
  *G06F 11/00* (2006.01)
  *G06F 12/14* (2006.01)
  *G06F 12/16* (2006.01)

(52) U.S. Cl. ............... 711/209; 711/E12.091; 711/163; 711/200; 726/22; 726/23; 726/24; 726/25

(58) Field of Classification Search ........... 711/E12.091, 711/200, 163; 726/22, 23, 24, 25
See application file for complete search history.

(56) References Cited

U.S. PATENT DOCUMENTS

| 7,546,430 | B1 * | 6/2009 | Miller et al. | 711/163 |
| 7,971,255 | B1 * | 6/2011 | Kc et al. | 726/24 |
| 2008/0016314 | A1 * | 1/2008 | Li et al. | 711/200 |
| 2008/0022405 | A1 * | 1/2008 | Wang et al. | 726/23 |
| 2009/0028135 | A1 * | 1/2009 | Mantripragada et al. | 370/352 |
| 2009/0183261 | A1 * | 7/2009 | Peinado et al. | 726/24 |
| 2011/0191848 | A1 * | 8/2011 | Zorn et al. | 726/22 |

* cited by examiner

*Primary Examiner* — Kevin Ellis
*Assistant Examiner* — Mehdi Namazi
(74) *Attorney, Agent, or Firm* — Holland & Hart LLP

(57) ABSTRACT

A method for preventing subversion of address space layout randomization (ASLR) in a computing device is described. An unverified module attempting to load into an address space of memory of the computing device is intercepted. Attributes associated with the unverified module are analyzed. A determination is made, based on the analyzed attributes, whether a probability exists that the unverified module will be loaded into a number of address spaces that exceeds a threshold. The unverified module is prevented from loading into the address space if the probability exists that the unverified module will be loaded into a number of address spaces that exceeds the threshold.

20 Claims, 6 Drawing Sheets

SYSTEMS AND METHODS FOR PREVENTING SUBVERSION OF ADDRESS SPACE LAYOUT RANDOMIZATION (ASLR)

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems are used to carry out several business, industry, and academic endeavors.

An operating system is the software component of a computer system that manages and coordinates processes executed by the system. In addition, the operating system manages and coordinates the various resources of the computer system. Operating systems also act as a host for computer programs that are ran on the computer system.

Most modern operating systems provide libraries to implement the majority of services provided by the computer system. Libraries include code and data that provide services to individual computer programs. The code may be executable code. Some operating systems have implemented dynamic linked libraries (DLLs) which allow code and data to be shared among various computer programs. For example, the code and/or data needed by multiple computer programs may be stored in one central DLL.

A dynamic linked library may be stored in an address space in the memory of the computer system. Because the DLL may include executable code, a malicious user may launch an attack, such as a buffer overflow, against the computer system if the user gains access to the executable code in the DLL. In order to hinder a malicious user from gaining access to the code within a DLL, an address space layout randomization (ASLR) technique may be used. The ASLR technique randomly arranges the position of libraries within address spaces of memory. This technique helps prevent the malicious user from locating a DLL in order to gain access to the code contained within the DLL.

However, a malicious user may load a module that appears benign to the computer system, but the module may expand and occupy numerous address spaces within the memory of the computer system. As a result, the malicious user may predict the address spaces that DLLs with executable code will be loaded because the module has exhausted many of the address space locations. The effectiveness of the ASLR technique is greatly reduced because many of the address space locations are not available when the DLL with executable code is randomly assigned an address space. As such, benefits may be realized by detecting and preventing benign modules from loading into the address space if the probability exists that the module may exhaust the available address spaces in memory.

SUMMARY

According to at least one embodiment, a method for preventing subversion of ASLR in a computing device is described. An unverified module attempting to load into an address space of memory of the computing device may be intercepted. Attributes associated with the unverified module may be analyzed. In one embodiment, a determination is made, based on the analyzed attributes, whether a probability exists that the unverified module will be loaded into a number of address spaces that exceeds a threshold. The unverified module may be prevented from loading into the address space if the probability exists that the unverified module will be loaded into a number of address spaces that exceeds the threshold. In one embodiment, the unverified module comprises a dynamic linked library (DLL) module.

In one embodiment, the module is verified and may be allowed to load into the address space if the probability does not exist that the module will be loaded into a number of address spaces that exceeds the threshold. The verified module may be loaded into a randomly assigned address space according to ASLR.

In one embodiment, the size of the unverified module is analyzed in a header to determine if the size of the unverified module is correctly represented in the header. A probability may exist that the unverified module will be loaded into a number of address spaces that exceeds the threshold if the size of the unverified module in the header does not correctly represent the size of the module.

In another embodiment, the contents of the unverified module may be analyzed to determine whether the contents are resource-only data. A probability may exist that the unverified module will be loaded into a number of address spaces that exceeds the threshold if the contents of the unverified module are resource-only data.

In a further embodiment, portable executable (PE) sections of the module may be analyzed to determine whether an entry point module includes valid instructions. A probability may exist that the unverified module will be loaded into a number of address spaces that exceeds the threshold if the portable executable (PE) sections of the module include an entry point module that does not contain valid instructions.

In an additional embodiment, sections within the unverified module may be analyzed to determine if the sections comprise repetitive bytes. A probability may exist that the unverified module will be loaded into a number of address spaces that exceeds the threshold if the sections within the unverified module comprise repetitive bytes.

A computer system that is configured to prevent subversion of address space layout randomization (ASLR) is also described. The computer system includes a processor and memory in electronic communication with the processor. The computer system may further include a security extension module. The module may be configured to intercept an unverified module attempting to load into an address space of memory of the computing device and analyze attributes associated with the unverified module. The module may be further configured to determine, based on the analyzed attributes, whether a probability exists that the unverified module will be loaded into a number of address spaces that exceeds a threshold. In addition the module may be configured to prevent the unverified module from loading into the address space if the probability exists that the unverified module will be loaded into a number of address spaces that exceeds the threshold.

A computer-program product for preventing subversion of address space layout randomization (ASLR) is also described. The computer-program product includes a computer-readable medium having instructions thereon. The instructions include code programmed to intercept an unverified module attempting to load into an address space of memory of the computing device, and code programmed to analyze attributes associated with the unverified module. In addition the instructions include code programmed to determine, based on the analyzed attributes, whether a probability exists that the unverified module will be loaded into a number of address spaces that exceeds a threshold. Further, the instructions include code programmed to prevent the unverified module from loading into the address space if the probability exists that the unverified module will be loaded into a number of address spaces that exceeds the threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
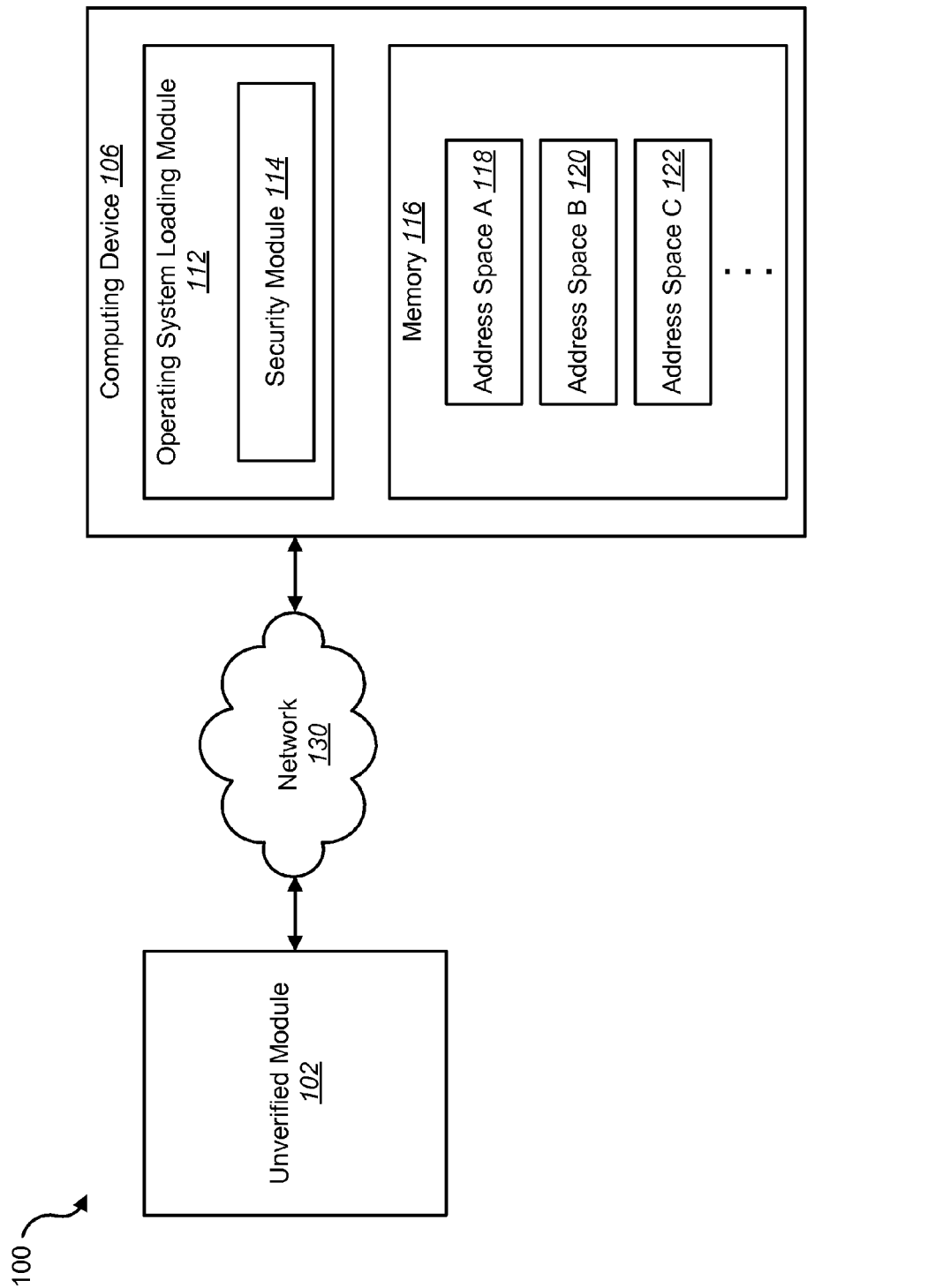
FIG. 1 is a block diagram illustrating one embodiment of a module verification system that determines whether to load an unverified module into memory of a computing device.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

FIG. 1 is a block diagram illustrating one embodiment of a module verification system 100 that determines whether to load an unverified module 102 into memory 116 of a computing device 106. In one embodiment, the computing device 106 may comprise a workstation, laptop, handheld device, client-side terminals, servers, distributed computing systems, or any other computing device. The computing device 106 may include memory 116 which includes a plurality of address spaces 118, 120, 122. While only three address spaces 118, 120, 122 are illustrated, the memory 116 may include more or less address spaces. In one embodiment, the address spaces 118, 120, 122 define a range of discrete addresses, each of which may correspond to a physical or virtual memory register, a network host, peripheral device, disk sector, or other logical or physical entity.

In one embodiment, the unverified module 102 is transmitted to the computing device 106 over a network 130. The network 130 may be a local area network (LAN), a wide area network (WAN), wireless local area network (WLAN), the Internet, or any other suitable network. In one embodiment, the unverified module 102 may be a dynamic link library (DLL) module. A DLL module may include code, data, and resources, in any combination. In one configuration, a DLL module may be loaded into the memory 116, and multiple programs or applications (not shown) executed on the computing device 106 may share the contents of the loaded DLL module.

In one aspect, the unverified module 102 may appear to be benign and non-malicious to the computing device 106. For example, the unverified module 102 may be a resource-only DLL which includes read only data, a .NET user control DLL which includes intermediate language (IL), etc. A truly benign and non-malicious DLL may be loaded into one or more address spaces 118, 120, 122 depending on the size of the unverified module 102. The unverified module 102 may be randomly loaded into one or more address spaces 118, 120, 122 according to address space layout randomization (ASLR). A resource-only DLL or a .NET user control DLL may be loaded into memory 116 prior to the loading of a well-known, verified module (not shown) into memory 116. The subsequently loaded module may be a DLL that includes source code that may be executed by the computing device 106. The well-known, verified module may also be loaded into one or more address spaces according to ASLR.

However, if the unverified module 102 is a malicious module, it 102 may expand while it 102 is being loaded into memory 116, and occupy additional address spaces within the memory 116. When a well-known, verified module (with source code that may be executed) is subsequently loaded into memory 116, the number of available address spaces is diminished because the unverified module 102 unnecessarily occupies additional address spaces. The ability to predict which address spaces will be occupied by the well-known, verified module increases. A malicious user who knows (with a high level of confidence) which address spaces are occupied by the well-known, verified module, may then use the source code to launch an attack against the computing device 106. For example, the malicious user may launch a buffer overflow attack using the code of the well-known, verified module that has been loaded into predictable address spaces.

In one configuration, the computing device 106 may include an operating system (OS) loading module 112. The OS loading module 112 may load the OS to the computing device 106. In one embodiment, the OS loading module 112 may include a security module 114. The security module 114 may analyze the unverified module 102 to determine whether there is a high probability that the unverified module 102 (while appearing benign) may expand and occupy additional address spaces if it 102 is loaded into memory 116. The security module 114 may prevent the unverified module 102 from loading into memory 116 if it 114 determines that the module 102 may expand to subvert ASLR techniques for subsequently loaded well-known, verified modules. In one embodiment, the security module 114 may be a kernel module that serves as an extension to the OS loading module 112. Details regarding the security module 114 are provided below.

Figure 2:
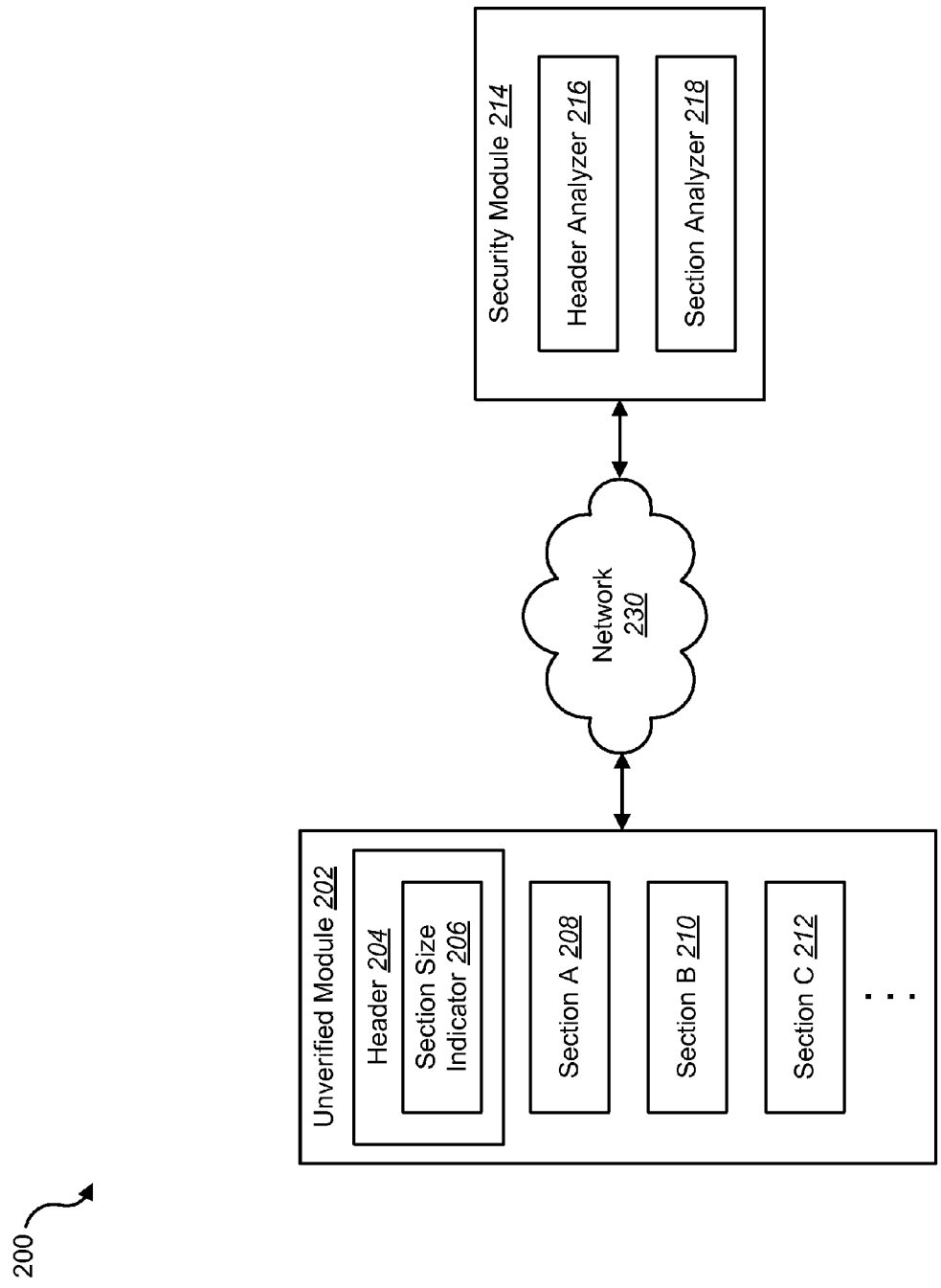
FIG. 2 is a block diagram illustrating another embodiment of a module verification system.

FIG. 2 is a block diagram illustrating another embodiment of a module verification system 200 that determines whether to load an unverified module 202 into the memory 116 of the computing device 106. The system 200 may include a security module 214 which analyzes the unverified module 202 received over a network 230.

In one embodiment, the unverified module 202 is a DLL, such as a resource-only DLL, a .NET user control DLL, etc. The data within the module 202 may be organized into one or more sections 208, 210, 212. Each section 208, 210, 212 may include its own set of attributes, such as being writable or read-only, executable (for code) or non-executable (for data), etc. In addition, each section may be a certain size and the combination of each section may result in the overall size of the unverified module 202. In one embodiment, the module 202 may include a header 204. The header 204 may include supplemental data placed at the beginning of the data within the unverified module 202. One example of supplemental data may be section size indicator data 206. The size indicator data 206 may indicate the size of each of the sections 208, 210, 212 within the module 202.

In one configuration, the security module 214 may include a header analyzer 216 and a section analyzer 218. The header analyzer 216 may analyze the heather 204 to determine the type of unverified module 202. For example, the header analyzer 216 may determine whether the module 202 is a resource-only module, a .NET user control module, etc. In addition, the header analyzer 216 may analyze the section size indicator data 206 to determine whether the size of the sections is representative of the actual size of the sections 208, 210, 212.

In one embodiment, the section analyzer 218 may analyze the sections 208, 210, 212 to determine the actual size of each of the sections 208, 210, 212. In addition, the section analyzer 218 may determine whether there are repetitive bytes within each of the sections 208, 210, 212. Further, the section analyzer 218 may determine whether the contents of the sections 208, 210, 212 are identical. For example, the section analyzer 218 may determine whether each of the sections 208, 210, 212 have the same hash and/or checksum. In one embodiment, the section header 218 may also determine whether the unverified module 202 include invalid portable executable (PE) sections (i.e., entry point does not include valid instructions).

Based on the analysis of the unverified module 202, the security module 214 may allow or prevent the unverified module 202 from being loaded into address spaces 118, 120, 122 within the memory 116 of the computing device 106. If the security module 214 concludes that there a probability exists that the unverified module 202 will expand to occupy additional address spaces, the security module 214 may prevent the module 202 from loading.

Figure 3:
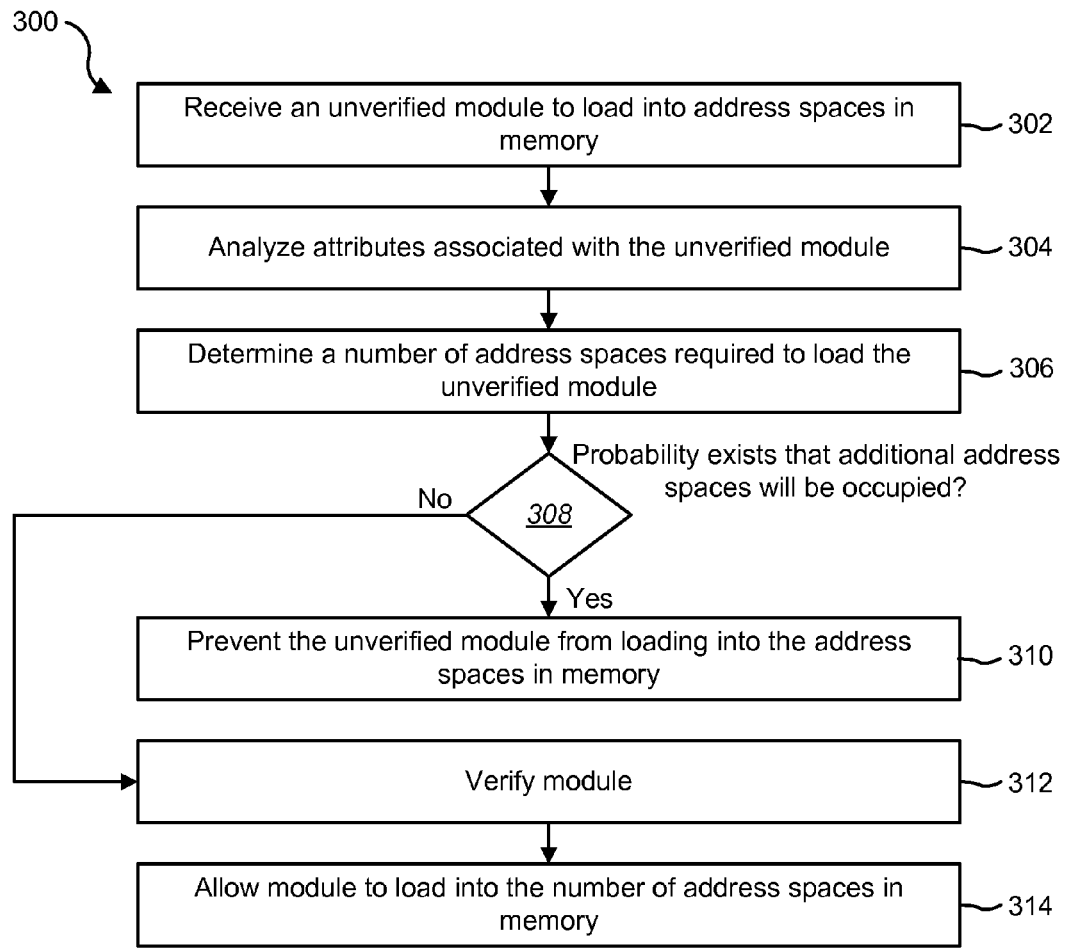
FIG. 3 is a flow diagram illustrating one embodiment of a method for detecting modules that attempt to subvert address space layout randomization (ASLR)

FIG. 3 is a flow diagram illustrating one embodiment of a method 300 for detecting modules that attempt to subvert ASLR. In one configuration, the method 300 may be implemented by the security module 114 on the computing device 106.

In one embodiment, an unverified module to load into address spaces of memory may be received 302. The module may be a resource-only DLL, a .NET user control DLL, etc. In one aspect, the received module appears to be non-malicious and benign.

In one configuration, attributes associated with the unverified module may be analyzed 308. For example, the header 204 and sections 208, 210, 212 of the unverified module may be analyzed as previously described. Based on the analysis, a number of address spaces required to load the unverified module may be determined 306.

In one embodiment, a determination 308 may be made as to whether or not a probability exists that the unverified module will occupy more address spaces than are needed to load the module. For example, the analyzed attributes may reveal that the unverified module may expand when it is loaded into memory and occupy additional address spaces. In one embodiment, the analysis of the attributes may include performing an analysis of the header 204 of the unverified module to verify that the sizes of the sections 208, 210, 212 are correctly represented by the header 204.

In another embodiment, if the module is a DLL, the analysis may reveal that the DLL is marked as a .NET via a flag in a portable executable (PE) header of the module. A DLL that is marked as a .NET may be arbitrarily loaded into address spaces for certain processes, such as Internet Explorer (IE), and may be expected to be an IL-only module. The analysis may determine if the DLL is dependent on another module previously loaded into memory 116 or if the DLL is merely an extension to IE that includes native code.

In a further embodiment, the analysis may reveal that the unverified module is a resource-only DLL (i.e., no export, no import) or that the module has invalid PE sections (i.e., entry point does not include valid instructions). In addition, the analysis may reveal that the sections of the module have repetitive bytes that are conducive to compression techniques. The analysis may also reveal that the sections of the unverified module are identical to sections of another module (i.e., sections of modules include identical contents and have the same hash and/or checksum) and that the unverified module is being loaded by a process with a name different from the identical module. The above-described attributes may indicate a probability exists that the unverified module will exhaust address space if it is allowed to be loaded into memory 116. Exhausting the address space may increase the chances of predictable load addresses for subsequent well-known, verified modules that are loaded. In one embodiment, if it is determined 308 that a probability exists that the unverified module will exhaust address spaces in memory, the unverified module may be prevented from loading into the address spaces in memory.

If the analysis of the attributes does not reveal a probability of the module occupying additional address spaces, the unverified module may be verified 312 and allowed 314 to load into the previously determined number of address spaces in memory. In one embodiment, the newly verified module may be loaded into the address spaces according to ASLR.

Figure 4:
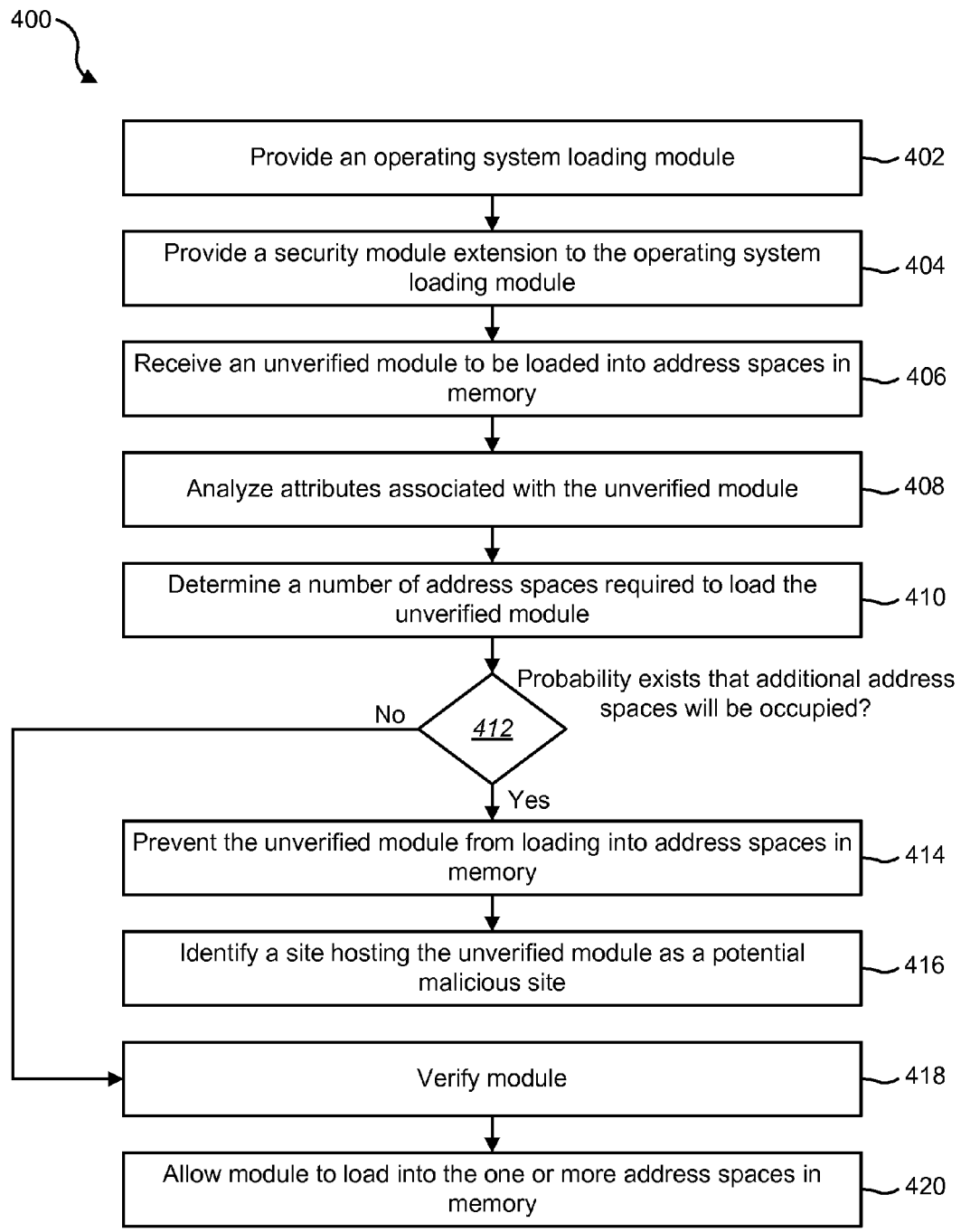
FIG. 4 is a flow diagram illustrating a further embodiment of a method for detecting modules that attempt to subvert ASLR.

FIG. 4 is a flow diagram illustrating a further embodiment of a method 400 for detecting modules that attempt to subvert ASLR. The method 400 may be implemented by the security module 114 in the computing device 106.

In one embodiment, an OS loading module may be provided 402 to load the operating system on the computing device 106. A security module extension to the OS loading module may also be provided 404. As previously described, the security module may be implemented as a kernel module that serves as an extension to the OS loading module.

In one configuration, an unverified module to be loaded into address spaces in memory may be received 406. The unverified module may be a DLL. Attributes associated with the unverified module may be analyzed 408 as described above in relation to FIG. 3. In addition, a number of address spaces required to load the unverified may be determined 410. In one embodiment, a determination 412 may be made as to whether the probability exists that address spaces beyond the determined number of address spaces will be occupied by the unverified module. In other words, based on the analysis of attributes, a determination 412 is made as to whether the unverified module will exhaust the address spaces in memory if the module is allowed to load into memory.

If it is determined, based on the analysis as described above in relation to FIG. 3, that a probability exists that the address spaces will be exhausted, the unverified module may be prevented from loading into address spaces in memory. In addition, a site hosting the unverified module may be identified 416 as a potential malicious site. In an alternative embodiment, the unverified module may be tracked and the security module 114 may alter security postures by enforcing different types of security policies and/or submitting the unverified module for detailed security analysis by a security service vendor.

If the analysis of the attributes does not reveal a probability of the module occupying additional address spaces, the unverified module may be verified 418 and allowed 420 to load into the previously determined number of address spaces in memory. In one embodiment, the newly verified module may be loaded into the address spaces according to ASLR.

Figure 5:
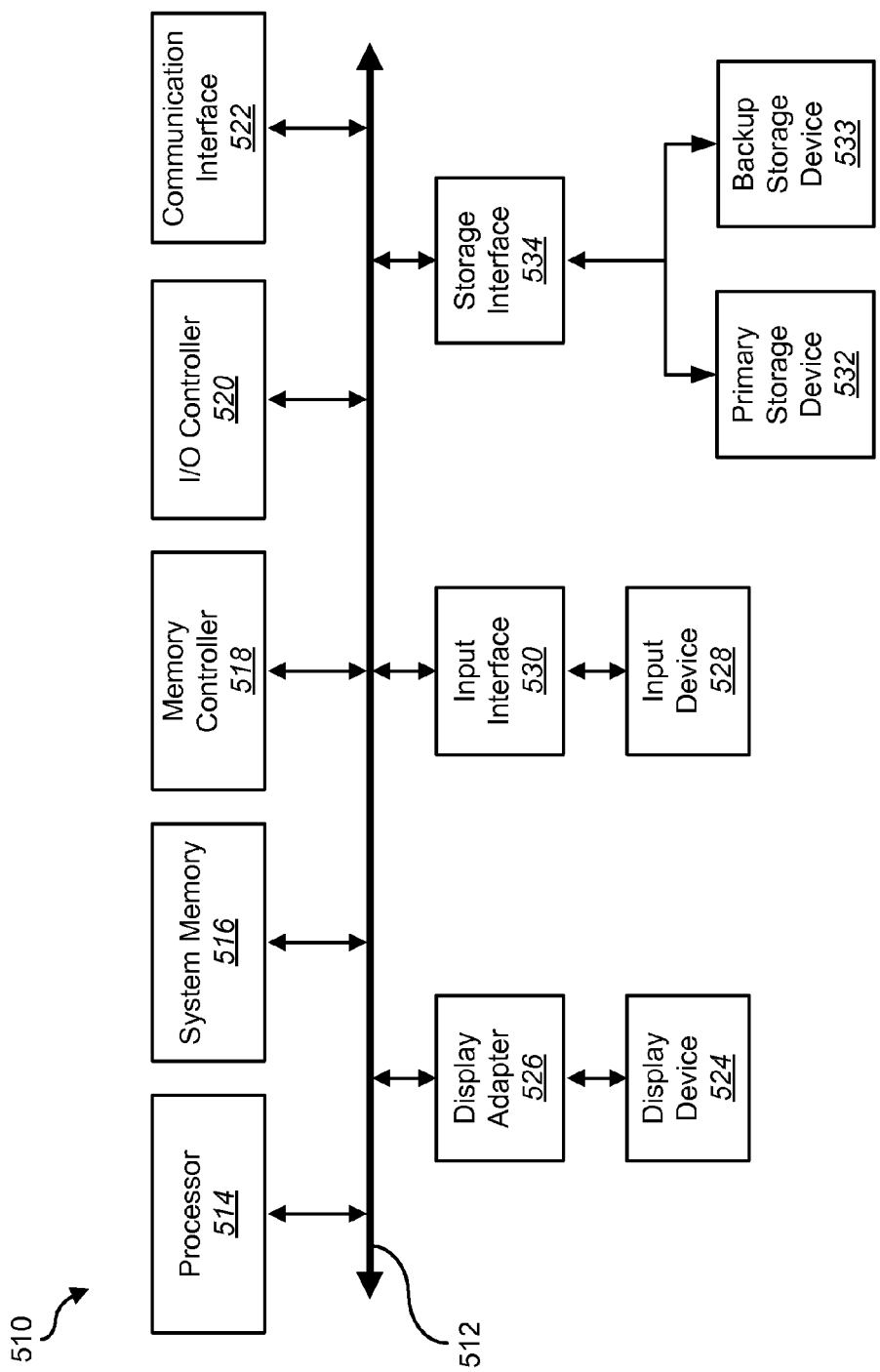
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the intercepting, analyzing, determining, and preventing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5 computing system 510 may comprise a memory controller 518, an I/O controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as intercepting, analyzing, determining, and preventing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for intercepting, analyzing, determining, and preventing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the intercepting, analyzing, determining, and preventing steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the intercepting, analyzing, determining, and preventing steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Storage devices 532 and 533 may also be used, for example, to perform and/or be a means for performing, either alone or in combination with other elements, one or more of the intercepting, analyzing, determining, and preventing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
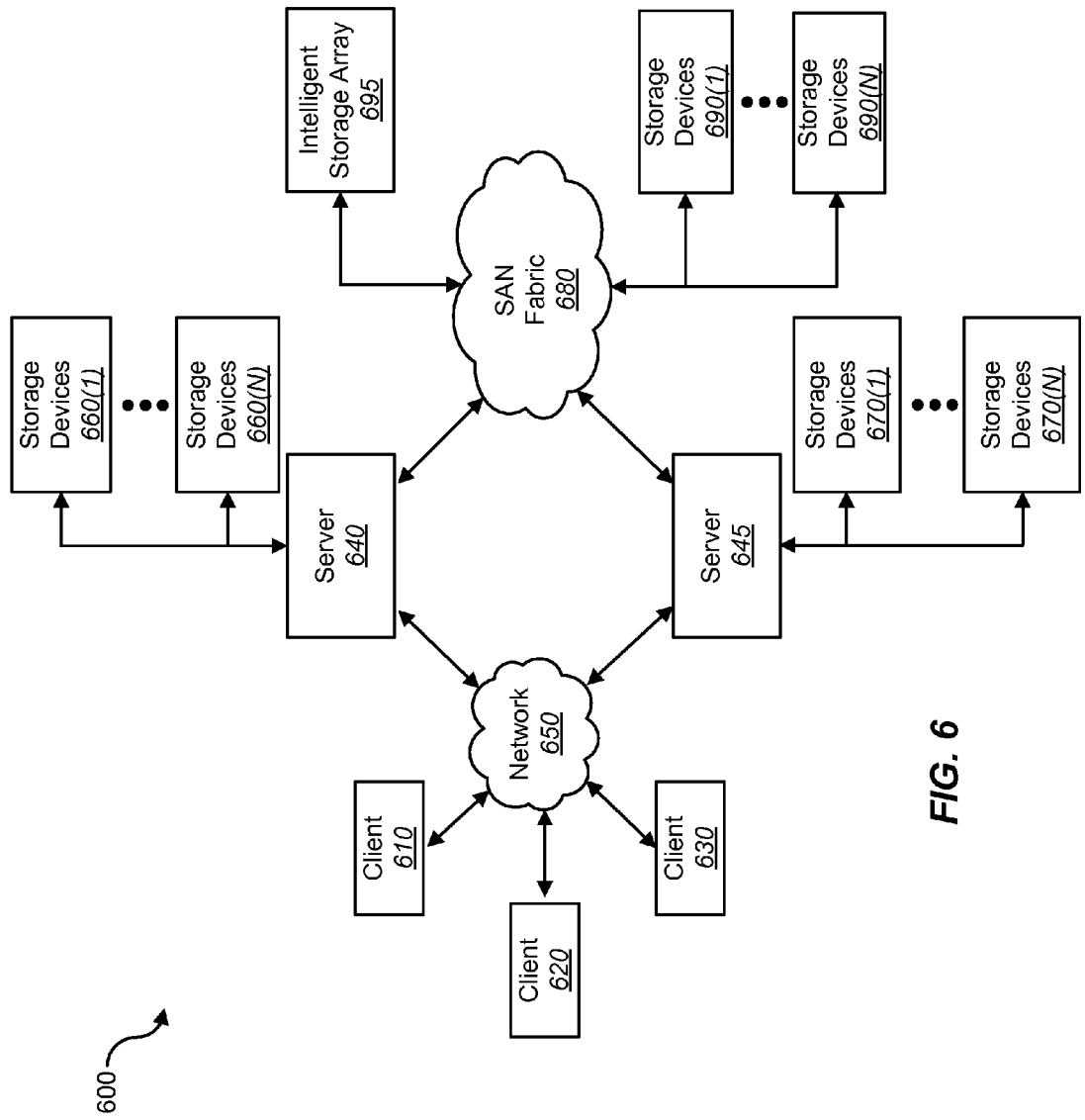
FIG. 6 is a block diagram of an exemplary network architecture in which client systems and servers and may be coupled to a network.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 780 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the intercepting, analyzing, determining, and preventing steps disclosed herein. Network architecture 600 may also be used to perform and/or be a means for performing other steps and features set forth in the instant disclosure.

As detailed above, computing system 510 and/or one or more of the components of network architecture 600 may perform and/or be a means for performing, either alone or in combination with other elements, one or more steps of the exemplary methods described and/or illustrated herein. For example, computing system 510 and/or one or more of the components of network architecture 600 may perform and/or be a means for performing a computer-implemented method for maintaining file-type information for a file that may comprise: 1) intercepting an unverified module attempting to load into an address space of memory of the computing device, 2) analyzing attributes associated with the unverified module, 3) determining, based on the analyzed attributes, whether a probability exists that the unverified module will be loaded into a number of address spaces that exceeds a threshold, and 4) preventing the unverified module from loading into the address space if the probability exists that the unverified module will be loaded into a number of address spaces that exceeds the threshold.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method for preventing subversion of address space layout randomization (ASLR) in a computing device, the method comprising:

intercepting an unverified module attempting to load into an address space of memory of the computing device;

analyzing attributes associated with the unverified module;

determining, based on the analyzed attributes, whether a probability exists that the unverified module will be loaded into a number of address spaces that exceeds a threshold; and preventing the unverified module from loading into the address space if the probability exists that the unverified module will be loaded into a number of address spaces that exceeds the threshold.

2. The method of claim 1, further comprising verifying the module and allowing the verified module to load into the address space if the probability does not exist that the module will be loaded into a number of address spaces that exceeds the threshold.

3. The method of claim 2, further comprising loading the verified module into a randomly assigned address space according to ASLR.

4. The method of claim 1, wherein analyzing attributes associated with the unverified module comprises analyzing the size of the unverified module in a header to determine if the size of the unverified module is correctly represented in the header.

5. The method of claim 4, wherein the probability exists that the unverified module will be loaded into a number of address spaces that exceeds the threshold if the size of the unverified module in the header does not correctly represent the size of the module.

6. The method of claim 1, wherein analyzing attributes associated with the unverified module comprises analyzing the contents of the unverified module to determine whether the contents are resource-only data.

7. The method of claim 6, wherein the probability exists that the unverified module will be loaded into a number of address spaces that exceeds the threshold if the contents of the unverified module are resource-only data.

8. The method of claim 1, wherein analyzing attributes associated with the unverified module comprises analyzing portable executable (PE) sections of the module to determine whether an entry point module includes valid instructions.

9. The method of claim 8, wherein the probability exists that the unverified module will be loaded into a number of address spaces that exceeds the threshold if the portable executable (PE) sections of the module include an entry point module that does not contain valid instructions.

10. The method of claim 1, wherein analyzing attributes associated with the unverified module comprises analyzing sections within the unverified module to determine if the sections comprise repetitive bytes.

11. The method of claim 10, wherein the probability exists that the unverified module will be loaded into a number of address spaces that exceeds the threshold if the sections within the unverified module comprise repetitive bytes.

12. The method of claim 1, wherein the unverified module comprises a dynamic linked library (DLL) module.

13. A computer system that is configured to prevent subversion of address space layout randomization (ASLR), the computer system comprising:
   a processor;
   memory in electronic communication with the processor; and
   a security extension module, the module configured to:
      intercept an unverified module attempting to load into an address space of memory of the computing device;
      analyze attributes associated with the unverified module;
      determine, based on the analyzed attributes, whether a probability exists that the unverified module will be loaded into a number of address spaces that exceeds a threshold; and
      prevent the unverified module from loading into the address space if the probability exists that the unverified module will be loaded into a number of address spaces that exceeds the threshold.

14. The computer system of claim 13, wherein the security extension module is further configured to analyze the size of the unverified module in a header to determine if the size of the unverified module is correctly represented in the header.

15. The computer system of claim 13, wherein the security extension module is further configured to analyze the contents of the unverified module to determine whether the contents are resource-only data.

16. The computer system of claim 13, wherein the security extension module is further configured to analyze portable executable (PE) sections of the module to determine whether an entry point module includes valid instructions.

17. The computer system of claim 13, wherein the rights-management module is further configured to analyze sections within the unverified module to determine if the sections comprise repetitive bytes.

18. The computer system of claim 13, wherein the probability exists that the unverified module will be loaded into a number of address spaces that exceeds the threshold if the size of the unverified module in the header does not correctly represent the size of the module, the contents of the unverified module are resource-only data, the portable executable (PE) sections of the module include an entry point module that does not contain valid instructions, or the sections within the unverified module comprise repetitive bytes.

19. The computer system of claim 13, wherein the unverified module comprises a dynamic linked library (DLL) module.

20. A computer-program product for preventing subversion of address space layout randomization (ASLR), the computer-program product comprising a non-transitory computer-readable storage medium having instructions thereon, the instructions comprising:
   code programmed to intercept an unverified module attempting to load into an address space of memory of the computing device;
   code programmed to analyze attributes associated with the unverified module;
   code programmed to determine, based on the analyzed attributes, whether a probability exists that the unverified module will be loaded into a number of address spaces that exceeds a threshold; and
   code programmed to prevent the unverified module from loading into the address space if the probability exists that the unverified module will be loaded into a number of address spaces that exceeds the threshold.

* * * * *